United States Patent Office 3,290,306
Patented Dec. 6, 1966

3,290,306
CERTAIN 2-OXYALKYL-4-HALOGENOPYRIMI-DINES AND INTERMEDIATES THEREFOR
Paul Schmidt, Therwil, and Ernst Schweizer, Basel, Switzerland, assignors to Ciba Corporation, New York, N.Y., a corporation of Delaware
No Drawing. Filed Feb. 17, 1965, Ser. No. 433,506
Claims priority, application Switzerland, Mar. 25, 1964, 3,834/64
45 Claims. (Cl. 260—247.5)

The present invention relates to new halogeno-pyrimidines. More particularly it concerns 4-halogeno-pyrimidines that contain in position 2 a radical of the formula R—O—alk- and in position 5 a radical of the formula $R_1$—X—, in which R represents a lower hydrocarbon radical of aliphatic character, alk a lower alkylene radical, X a direct bond or a lower alkylene radical and $R_1$ an aromatic radical, and their salts and processes for their manufacture.

A suitable halogen atom in position 4 is, for example, bromine or especially chlorine. The lower alkylene radicals alk, and possibly X, contain preferably 1 to 4 carbon atoms and represent above all methylene groups.

Particularly suitable lower hydrocarbon radicals of aliphatic character (R) are, for example, lower aliphatic hydrocarbon radicals or at most mononuclear alicyclic or alicyclyl-aliphatic hydrocarbon radicals.

Lower aliphatic hydrocarbon radicals are primarily those which contain up to 7 carbon atoms, in the first place lower alkyl radicals such as methyl or ethyl, or straight or branched propyl, butyl, pentyl or hexyl radicals which may be linked in any desired position, or lower alkenyl radicals such as allyl or methallyl. At most mononuclear alicyclic hydrocarbon radicals are in the first place cycloalkyl or cycloalkenyl radicals which may be substituted by lower alkyl radicals, especially by methyl, e.g. cyclopentyl, cyclohexyl, cycloheptyl, cyclopentenyl, cyclohexenyl or cycloheptenyl. At most mononuclear alicyclyl-aliphatic hydrocarbon radicals are above all those in which the alicyclic radicals, especially those which have just been mentioned, are linked through lower alkylene or alkenylene bridges, above all methylene or ethylene.

Aromatic radicals $R_1$ are preferably phenyls which may be mono- or polysubstituted, e.g. by halogen atoms such as fluorine, chlorine or bromine, lower alkyl groups, e.g. those mentioned above and above all methyl, ethyl, propyl, isopropyl or tertiary butyl, alkoxy or alkenyloxy groups such as methoxy, ethoxy, propyloxy, isopropyloxy, n-butoxy, allyloxy or methylenedioxy groups, amino such as dimethylamino groups and/or trifluoromethyl groups. The radical $R_1$—X—in position 5 is preferably a benzyl radical in which the phenyl radical may be substituted, for example as indicated above.

The new pyrimidines may be substituted in position 6, especially for example by the following groups: Lower alkyl radicals, e.g. those mentioned above and especially methyl, ethyl or propyl; free or etherified, above all lower alkylated, hydroxy groups e.g. those in which the alkyl radical is one of the lower alkyls mentioned above, preferably hydroxyl or methoxy groups; halogen atoms, e.g. bromine or preferably chlorine; or amino groups. These amino groups may be primary or secondary, but above all they are tertiary. The amino groups may be substituted, for example, by lower aliphatic or cycloaliphatic hydrocarbon radicals whose carbon chain may be interrupted by oxygen, such as lower alkyl, e.g. methyl or ethyl; linear or branched propyl, butyl or pentyl radicals linked in any desired position; cycloalkyl or cycloalkyl-alkyl groups such as cyclopentyl, cyclohexyl, or cyclopentylmethyl or -ethyl or cyclohexylmethyl or -ethyl; alkylene radicals such as butylene-(1,4), pentylene-(1,5), penytlene-(2,5), hexylene-(1,6)), heptylene-(1,7), hexylene-(2,5), hexylene-(2,6) or heptylene-(2,6) radicals, or lower alkyl, alkylene, cycloalkyl or cycloalkyl-alkyls that may be interrupted by oxygen, such as methoxyethyl, ethoxyethyl, 3-oxapentylene-(1,5) or 2-oxa-cyclopentylmethyl: In the first place an amino group in position 6 is a di-lower alkyl-amino group such as the dimethyl-, methylethyl-, diethyl-, dipropyl- or diisopropyl-amino group or the pyrrolidino, piperidino, hexamethyleneamino, heptamethyleneamino or morpholino group.

Specially mentioned should be those new compounds in which the substituents in positions 2, 4 and 5 have the above meanings, especially those specifically indicated, belonging to the following groups according to the radical in position 6: those which are substituted in position 6 by a halogen atom; which are substituted in position 6 by a free hydroxyl group or by an amino group which may be free or substituted as indicated; those which are substituted in position 6 by an etherified hydroxyl group; and those which are in position 6 unsubstituted or substituted by a lower lakyl radical.

The new compounds possess valuable pharmacological properties. When administered to dogs, they act as inhibitors on the central nervous system. The new compounds may be used as sedatives, hypnotics and narcotics.

Particularly valuable are the compounds of the formula

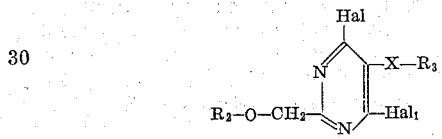

where Hal and $Hal_1$ are halogen atoms, above all chlorine atoms, $R_2$ represents a lower alkyl radical, e.g. one of those mentioned above, especially methyl or ethyl, X represents a direct bond or a lower alkylene radical, above all methylene, and $R_3$ represents a phenyl radical which may be substituted, e.g. as indicated above.

In the aforementioned group there stand out the compounds of the formula

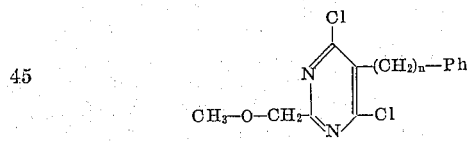

in which Ph represents a phenyl group which may be un-substituted or substituted by one or several lower alkyl or alkoxy groups, e.g. methyl, methoxy or methylenedioxy, halogen atoms, e.g. fluorine or chlorine, and/or trifluoromethyl groups, and $n=0$ or above all 1, and among them above all the narcotically very potent 2-methoxymethyl-4,6-dichloro-5-benzyl-pyrimidine of the formula

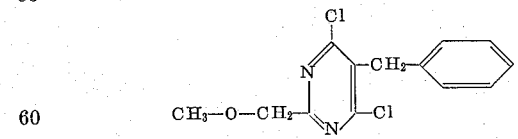

and 2-methoxymethyl-4,6-dichloro-5-phenyl-pyrimidine.

Of great value are also the compounds of the formula

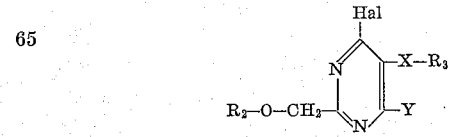

in which Hal represents a halogen, especially chlorine, atom, and Y a free hydroxyl group or a free amino group or an amino group substituted by lower aliphatic or cycloaliphatic hydrocarbon radicals whose carbon chain may be interrupted by oxygen, $R_2$ represents a lower alkyl radical, e.g. one of those mentioned above, especially methyl or ethyl, X represents a lower alkylene radical, above all methylene, or a direct bond, and $R_3$ represents a phenyl radical which may be substituted, e.g. as indicated above.

Of special value in this group are the compounds of the formula

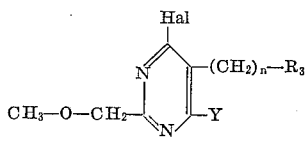

where Hal, Y and $R_3$ have the above meanings and $n=0$ or especially 1, more particularly the compounds of the formulae

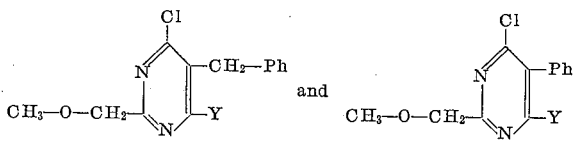

in which Y has the above meaning and Ph represents an unsubstituted phenyl radical or a phenyl radical which is substituted by one or several lower alkyl or alkoxy groups, e.g. methyl, methoxy or methylenedioxy, halogen atoms e.g. fluorine or chlorine, and/or trifluoromethyl groups.

Specially preferred compounds in this group are those in which Y represents hydroxyl or amino, di-lower alkylamino, especially dimethylamino or diethylamino, pyrrolidino, piperidino or morpholino. More especially, there may be mentioned 2-methoxymethyl-4-chloro-5-benzyl-6-hydroxypyrimidine.

Another group of particularly active substances includes those of the formula

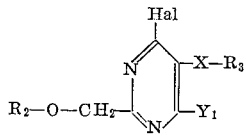

in which Hal represents a halogen atom, especially chlorine, $R_2$ a lower alkyl radical, e.g. one of those mentioned above, particularly methyl or ethyl, X represents a direct bond or a lower alkylene radical, above all methylene, and $R_3$ is a phenyl radical which may be substituted, e.g. as indicated above, and $Y_1$ represents hydrogen or above all a lower alkyl radical, e.g. one of those mentioned above, primarily methyl.

A special place in this group is taken by the compounds of the formula

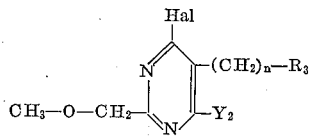

in which $n=0$ or above all 1, $R_3$ and Hal have the above meanings, and $Y_2$ is hydrogen or preferably methyl, and above all the compounds of the formula

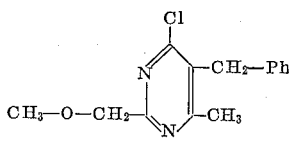

where Ph is a phenyl radical which may be unsubstituted or substituted by one or several alkyl or alkoxy groups, e.g. methyl, methoxy or methylenedioxy, halogen atoms, e.g. fluorine or chlorine, and/or trifluoromethyl groups. Special mention deserves 2-methoxymethyl-4-chloro-5- benzyl-6-methylpyrimidine, which is a very good sedative.

The new compounds are manufactured by known methods. Advantageously, a 4-hydroxypyrimidine that contains in position 2 a radical of the formula R—O—Alk— and in position 5 a radical of the formula $R_1$—X— (where R is a lower hydrocarbon radical of aliphatic character, alk a lower alkylene radical, X a direct bond or a lower alkylene radical and $R_1$ an aromatic radical) is treated with an agent capable of exchanging the hydroxyl group for a halogen atom and, if desired, in a resulting compound a substituent possibly present in position 6 is converted and, if desired, a resulting salt-forming free compound is converted into a salt thereof or a resulting salt is converted into the free compound.

Thus, for example, the starting material used may be a 2 - (R-O-Alk)-5-($R_1$-X)-4-hydroxypyrimidine that contains in position 6 no substituent or a lower alkyl radical or a free hydroxyl group. When exchanging the 4-hydroxyl group for the halogen atom, a possibly present 6-hydroxyl group may likewise be exchanged for a halogen atom in one and the same step.

If the resulting 4-halogen compounds still contain a hydroxyl group in position 6, it can be exchanged for a halogen atom by further treatment with agents capable of exchanging a hydroxyl group for a halogen atom.

Furthermore, a 6-halogen atom in a resulting compound can be exchanged in the usual manner for hydrogen or a free or etherified hydroxyl or mercapto group or for an amino group; furthermore, a mercapto group can be etherified, for example alkylated or aralkylated, in the usual manner.

These subsequent reactions may be carried out singly or in combination.

The aforementioned reactions are performed in the known manner.

An agent capable of exchanging a hydroxyl group for a halogen atom is, for example a halide of sulfur or especially of phosphorus, e.g. phosphorus pentachloride, phosphorus oxychloride, phosphorus trichloride or a corresponding bromide. The reaction is performed in the usual manner, if desired or required in the presence of a tertiary base, such as triethylamino or dimethylaniline.

The exchange of a 6-halogen atom for hydrogen may be performed in the usual manner, e.g. by dehalogenating hydrogenation, such as hydrogenation in the presence of a nickel or palladium catalyst. The exchange of the 6-halogen atom for a free hydroxyl group is likewise carried out in the usual manner, e.g. by alkaline hydrolysis such as hydrolysis with an aqueous alkali. The conversion of the halogen atom mentioned into an etherified hydroxyl group or into a free or etherified mercapto group likewise follows the usual practice and consists e.g. in the reaction with an alcohol, hydrogen sulfide or a mercaptan in the form of their metal salts or in the presence of a condensing agent capable of forming such salts. The exchange of the halogen atom in position 6 for an amino group is performed in the usual manner, e.g. by treatment with ammonia or an amine. In these reactions account must be taken of the fact that the halogen atom in position 4 should not participate in the reaction. Since in the reactions referred to it is less reactive than the substituents in positon 6, the reactions are performed under the selective conditions generally used for such partial reactions. A free mercapto group is preferably alkylated or aralkylated with a reactive ester, e.g. a halide, sulfate or sulfonate of an alkanol or aralkanol.

The starting materials are known or can be prepared by known methods. Thus, the starting materials used may be an R-O-alkane acid amidine and an $R_1$-X-malonic acid diester, an α-formyl-α-($R_1$-X)-acetate or an aldehyde derivative thereof, an α-alkanoyl-α-($R_1$-X)-acetate or an α-cyano-α-($R_1$-X)-acetate or a suitable equivalent compound; the pyrimidine ring is closed in the usual manner and, if desired a 6-substituent of the resulting 2-(R-O-

Alk)-4-hydroxy-5-($R_1$-X)-pyrimidine is converted in the usual manner.

The R-O-alkane acid amidines used in the manufacture of the starting materials as the derivatives of acetic and malonic acid are prepared in the usual manner.

The invention includes also any modification of the process in which an intermediate obtained at any stage thereof is used as starting material and any remaining step/steps is/are carried out or the process is discontinued at any stage thereof, or in which a starting material is formed in situ or is used as a salt thereof. It further includes the new starting materials, more especially the 2-(R-O-Alk)-4-hydroxy-5-($R_1$-X)-6-Z-pyrimidines, where Z is hydrogen, lower alkyl or a free hydroxyl group.

The reactions of this invention are preferably performed with the use of starting materials that give rise to the above-mentioned preferred process products.

Depending on the substituents the new compounds may be in the form of salts with metals or with strong bases or with acids. Compounds of an acid nature can be converted into corresponding salts, e.g. by reaction with basic agents, especially with therapeutically acceptable bases, e.g. metal hydroxides or basic salts, especially alkali metal or alkaline earth metal hydroxides or carbonates, ammonia or organic amines. A resulting compound of basic nature can be converted into a salt in the usual manner by reaction with an organic or inorganic acid, especially one that is capable of forming therapeutically acceptable salts. On the other hand, a resulting salt can be converted into the free compound in the usual manner, e.g. by treatment with an acid, a basic agent or an ion exchange resin. As acids suitable for formation of therapeutically acceptable salts there may be mentioned, for example, hydrohalic, sulfuric and phosphoric acids, nitric and perchloric acid; aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic, pyruvic acid; phenylacetic, benzoic, para-aminobenzoic, anthranilic, para-hydroxybenzoic, salicylic, para-aminosalicylic or embonic acid, methane-sulfonic, ethanesulfonic, hydroxyethanesulfonic, ethylene-sulfonic acid; halobenzenesulfonic, toluenesulfonic, napthalenesulfonic acids or sulfanilic acid.

These or other salts of the new compounds, for example the picrates, may also be used for purifying the resulting compounds by converting them into salts, isolating the latter and liberating the free compound from them. In view of the close relationship between the new compounds in the free form and in the form of their salts what has been said above and hereinafter with reference to the free compounds concerns also the corresponding salts wherever this is possible and applicable.

The new compounds may be used as medicaments, for example in the form of pharmaceutical preparations containing them or their salts in admixture or conjunction with an organic or inorganic, solid or liquid pharmaceutical excipient suitable for enteral or parenteral administration. Suitable excipients are substances that do not react with the new compounds, e.g. water, gelatin, lactose, starches, magnesium stearate, talcum, vegetable oils, benzyl alcohols, gums, polyalkyleneglycols, cholesterol or other known medicinal excipients. The pharmaceutical preparations may be, for example, tablets, or dragees, or in liquid form solutions, suspensions or emulsions. They may be sterilized and/or may contain assistants such as preserving, stabilizing, wetting or emulsifying agents, salts for regulating the osmotic pressure or buffers. They may also contain further therapeutically valuable substances. The preparations—which may also be used in veterinary medicine—are formulated by the conventional methods.

The following examples illustrate the invention without restricting its scope thereto.

*Example 1*

A suspension of 24.6 g. of 2-methoxymethyl-4,6-dihydroxy-5-benzylpyrimidine in 50 ml. of toluene is chlorinated with a mixture of 100 ml. of phosphorus oxychloride and 16.5 g. of triethylamine by being heated for 2 hours at 120° C., whereupon the phosphorus oxychloride and toluene are distilled off under vacuum. The residue is poured over ice, whereupon crystalline 2-methoxymethyl - 4,6 - dichloro - 5 - benzylpyrimidine of the formula

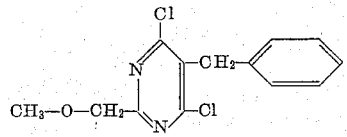

settles out. The solution is neutralized with ammonia and the substance is suctioned off, dried and distilled; it boils at 125° C. under 0.03 mm. Hg pressure and melts at 42 to 43° C.

The starting material is accessible thus:

Hydrochloric acid dried over concentrated sulfuric acid is introduced at 0° C. into a mixture of 355 g. of methoxyacetonitrile and 300 cc. of ethanol until saturation has been reached. The batch is kept overnight in a cooling cabinet at +5° C., then rapidly suction-filtered, and the methoxy-acetimino-ethyl ether hydrochloride, while still moist with ether, is introduced into cooled 500 cc. of 12% ammoniacal ethanol. The whole is agitated for 12 hours; the precipitated ammonium chloride is filtered off and the filtrate concentrated at 50° C. under vacuum. Methoxyacetamidine hydrochloride crystallizes out and melts after recrystallization from ethanol plus ether at 70° C.

62 g. of methoxy-acetamidine hydrochloride and 125 g. of benzylmalonic acid diethyl ester are dissolved in 200 ml. of methanol, a methylate solution from 34.5 g. of sodium and 600 ml. of methanol is added, and the mixture is heated for 24 hours at 50° C. The methanol is then distilled off and the residue dissolved in water. On acidification with glacial acetic acid, 2-methoxymethyl-4,6-dihydroxy-5-benzylpyrimidine settles out. After recrystallization from glacial acetic acid it melts at 295 to 296° C.

*Example 2*

26.6 g. of 2-methoxymethyl-4,6-dihydroxy-5-para-chlorophenylpyrimidine are suspended in 100 ml. of phosphorus oxychloride, 20.2 g. of triethylamine are slowly dropped in and the mixture is heated for 2 hours at 120° C. The phosphorus oxychloride is distilled off under vacuum and the reaction poured over ice water, whereupon the 2-methoxymethyl-4,6-dichloro-5-para-chlorophenylpyrimidine of the formula

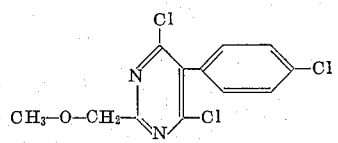

crystallized out; it is suctioned off, dried and distilled. It boils at 125 to 127° C. under 0.05 mm. Hg pressure and melts at 92 to 93° C.

The starting material is obtained by condensing 12.4 g. of methoxy-acetamidine hydrochloride with 27.6 g. of para-chlorophenyl-malonic acid ethyl ester in a methylate solution from 7 g. of sodium and 200 ml. of methanol. The batch is stirred for 12 hours at room temperature and then heated for 1 hour at 70° C., the methanol is distilled off and the residue dissolved in water. On acidification, 2-methoxy-methyl-4,6-dihydroxy-5-para-chlorophenylpyrimidine settles out; it melts at 300° C.

Example 3

A mixture of 28.3 g. of 2-methoxymethyl-4,6-dichloro-5-benzylpyrimidine and 800 ml. of 2 N-sodium hydroxide solution is refluxed for 15 hours. The hot solution is filtered, allowed to cool and adjusted with glacial acetic acid to pH 5.5. 2-methoxymethyl-4-chloro-5-benzyl-6-hydroxypyrimidine of the formula

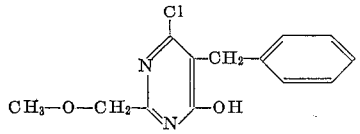

settles out in crystalline form. After recrystallization from methanol it melts at 159° C.

Example 4

A benzolic solution of 14.15 g. of 2-methoxymethyl-4,6-dichloro-5-benzylpyrimidine and 12.4 g. of methylamine is agitated in an autoclave for 5 hours at 80° C. The salt is filtered off, the benzene distilled off and the residue recrystallized from ethanol, to yield 2-methoxymethyl-4-chloro-5-benzyl-6-methylaminopyrimidine of the formula

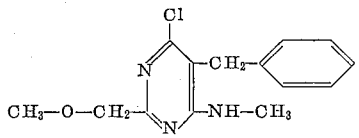

melting at 130 to 131° C.

Example 5

A mixture of 23.2 g. of 2-methoxymethyl-4,6-dihydroxy-5-phenylpyrimidine, 100 ml. of toluene and 50 ml. of phosphorus oxychloride is mixed slowly, while being stirred, with 20.2 g. of triethylamine and then heated for 2 hours at 120° C. Phosphorus oxychloride and toluene are then distilled off under vacuum and the residue is poured over ice plus water. After neutralization, the precipitate is suctioned off, dried and purified by distillation, to yield 2-methoxymethyl-4,6-dichloro-5-phenylpyrimidine of the formula

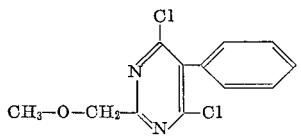

which melts at 87° C. and boils at 128 to 131° C. under 0.04 mm. Hg pressure. 2-methoxymethyl-4,6-dihydroxy-5-phenylpyrimidine is obtained by condensing 62 g. of methoxyacetamidine hydrochloride with 118 g. of phenylmalonic acid diethyl ester in the presence of a methylate solution prepared from 34.5 g. of sodium and 800 ml. of methanol by refluxing for 24 hours. The methanol is then distilled off and the residue dissolved in water. On acidification, 2-methoxymethyl-4,6-dihydroxy-5-phenylpyrimidine settles out in crystalline form. After recrystallization from acetic acid it melts at 309° C.

Example 6

10 g. of triethylamine are slowly dropped into a suspension of 24 g. of 2-methoxymethyl-4-hydroxy-5-benzyl-6-methylpyrimidine in 100 ml. of phosphorus oxychloride; the reaction mixture is then heated for 2 hours in an oil bath at 120° C.; the phosphorus oxychloride is distilled off under vacuum, and the residue is poured into ammoniacal ice water. The mixture is extracted by agitation with methylenechloride, the organic phase dried over sodium sulfate and then filtered off, and the methylenechloride is distilled off. The residue is fractioned, to yield 2-methoxymethyl-4-chloro-5-benzyl-6-methylpyrimidine of the formula

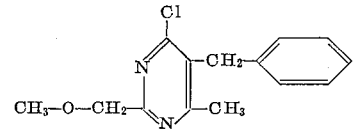

boiling at 145° C. under 0.05 mm. Hg pressure.

The 2-methoxymethyl-4-hydroxy-5-benzyl-6-methylpyrimidine used as starting material is obtained by reacting 248 g. of methoxy-acetamidine hydrochloride and 44 g. of benzylacetic acid ethyl ester in a methylate solution from 9.2 g. of sodium and 200 ml. of methanol by refluxing for 12 hours. The methanol is then distilled off, the residue dissolved in water and the compound precipitated with acetic acid; after recrystallization from ethanol it melts at 114 to 115° C.

Example 7

50.4 g. of triethylamine are dropped into a mixture of 65 g. of 2-ethoxymethyl-4,6-dihydroxy-5-benzylpyrimidine, 150 ml. of phosphorus oxychloride and 200 ml. of absolute toluene at a rate such that the temperature does not rise above 70° C. The batch is then refluxed for 2½ hours and the phosphorus oxychloride and toluene are distilled off under vacuum. Methylenechloride is added to the residue and this mixture is poured into ice water while keeping it neutral with ammonia. The organic phase is suctioned off, the aqueous phase repeatedly agitated with methylenechloride, and the combined extracts are dried over Siccon and filtered. The methylenechloride is distilled off and the residue fractionated in a high vacuum, to yield 2-ethoxymethyl-4,6-dichloro-5-benzylpyrimidine of the formula

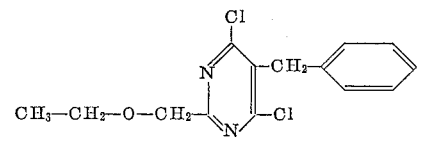

which boils at 147° C. under 0.3 mm. Hg pressure.

The starting material is prepared in the following manner:

Hydrochloric acid dried over concentrated sulfuric acid is introduced at 0° C. under a solution of 122.5 g. of ethoxyacetonitrile in 69 g. of ethanol until saturation has been achieved. The suctioned-off ethoxyacetimino ethyl ether hydrochloride is introduced into 600 cc. of 12% ammoniacal ethanol, the mixture is shaken for 12 hours, the precipitated ammonium chloride filtered off and the filtrate evaporated at 50° C. The crystalline mass is then pasted with ether and suctioned.

68.7 g. of ethoxyacetamidine hydrochloride and 125 g. of benzylmalonic acid diethyl ester are condensed by being heated for 12 hours with a methylate solution obtained from 34.5 g. of sodium and 800 ml. of methanol. The methanol is then distilled off and the residue dissolved in water. On acidification with glacial acetic acid, 2-ethoxymethyl-4,6-dihydroxy-5-benzylpyrimidine is obtained which on recrystallization from glacial acetic acid melts at 298 to 299° C.

Example 8

50.4 g. of triethylamine are dropped into a mixture of 65 g. of 2-methoxymethyl-4,6-dihydroxy-5-(β-phenethyl)-pyrimidine, 150 ml. of phosphorus oxychloride and 200 ml. of absolute toluene at a rate such that the temperature does not rise above 70° C. The batch is then heated for 2½ hours in an oil bath at 120° C., phosphorus oxychloride and toluene are distilled off under vacuum and the residue is stirred into ammoniacal ice water. The mixture is extracted with methylenechloride, the solution dried over Siccon, filtered, the solvent is distilled off and the residual oil fractionated in a high vacuum to yield 2 - methoxy - methyl - 4,6 - dichloro - 5 - (β - phenethyl)-pyrimidine of the formula

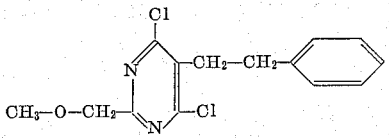

which boils at 162 to 163° C. under 0.3 mm. Hg pressure and melts at 49–51° C.

The 2 - methoxymethyl - 4,6 - dihydroxy - 5 - (β-phenethyl)-pyrimidine used as starting material is obtained by condensing 62 g. of methoxy-acetamidine hydrochloride with 132 g. of β-phenethylmalonic acid diethyl ester in a methylate solution from 34.5 g. of sodium and 800 ml. of methanol by refluxing for 12 hours. The methanol is distilled off, the residue dissolved in water, and the product precipitated with glacial acetic acid. On recrystallization from glacial acetic acid it melts at 295 to 296° C.

*Example 9*

67 g. of triethylamine are added to a mixture of 92 g. of 2 - methoxymethyl - 4,6 - dihydroxy - 5 - (para-methoxy-benzyl)-pyrimidine and 300 ml. of phosphorus oxychloride and the whole is heated for 2 hours at 120° C. The phosphorus oxychloride is then distilled off under vacuum, the residue poured into ice water, and the crystalline precipitate is suctioned off, once more suspended in ammoniacal water and suctioned off, then dissolved in methylenechloride, dried over Siccon, filtered, and the solvent is distilled off, to yield 2-methoxymethyl-4,6-dichloro-5-(para-methoxybenzyl)-pyrimidine of the formula

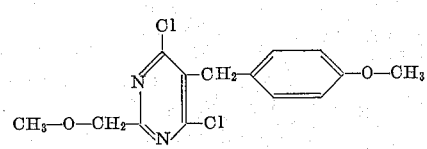

which is recrystallized from methanol and melts at 80 to 82° C.

The starting product is obtained by refluxing 140 g. of para-methoxybenzylmalonic acid diethyl ester and 62 g. of methoxy-acetamidine hydrochloride in a methylate solution from 34.5 g. of sodium and 600 ml. of methanol for 15 hours. The methanol is then distilled off and the residue dissolved in water. Acidification with acetic acid yields 2 - methoxymethyl - 4,6 - dihydroxy - 5 - (para-methoxybenzyl)-pyrimidine which, after recrystallization from glacial acetic acid, melts at 285 to 287° C. with decomposition.

*Example 10*

A mixture of 20 g. of 2-methoxymethyl-4,6-dichloro-5-(para-methoxybenzyl)-pyrimidine and 600 ml. of aqueous 2 N-sodium hydroxide solution is refluxed for 2½ hours. While still hot, the solution is treated with animal carbon, filtered, allowed to cool, and its pH is adjusted to 5 with hydrochloric acid. The precipitated 2-methoxymethyl - 4 - chloro - 5 - (para - methoxybenzyl) - 6-hydroxypyrimidine of the formula

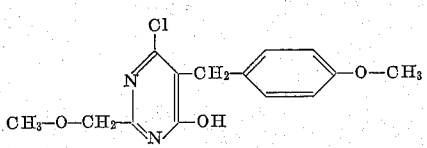

is suctioned off and recrystallized from methanol; it melts at 171 to 172° C.

*Example 11*

20.2 g. of triethylamine are slowly stirred into a mixture of 33.6 g. of 2-methoxymethyl-4,6-dihydroxy-5-(3',4',5'-trimethoxybenzyl)-pyrimidine and 200 ml. of phosphorus oxychloride, and the whole is heated for 12 hours at 50° C. The phosphorus oxychloride is then distilled off under vacuum and the residue poured into ice water. The batch is neutralized, agitated with methylenechloride and the organic phase is dried over sodium sulfate. On removal of the methylenechloride by distillation, 2-methoxymethyl - 4,6 - dichloro - 5 - (3',4',5' - trimethoxybenzyl)-pyrimidine of the formula

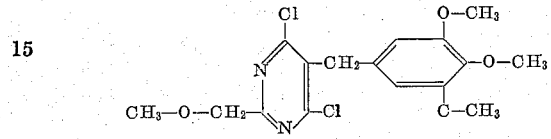

is obtained. It is recrystallized from isopropyl ether and melts at 74 to 76° C.

The starting material can be prepared thus:

18.6 g. of methoxyacetamidine hydrochloride and 51 g. of 3,4,5-trimethoxybenzylmalonic acid diethyl ester are added to a methylate solution prepared from 10.5 g. of sodium and 200 ml. of methanol, and the whole is refluxed for 24 hours. The methanol is then distilled off and the residue dissolved in water. On acidification with glacial acetic acid, 2-methoxymethyl-4,6-dihydroxy-5-(3',4',5'-trimethoxybenzyl)-pyrimidine settles out. It is recrystallized from aqueous acetic acid and melts at 272 to 273° C.

*Example 12*

A mixture of 7.5 g. of the 2-methoxymethyl-4,6-dichloro-5-(3',4',5'-trimethoxybenzyl)-pyrimidine described in Example 11 and 200 ml. of 2 N-sodium hydroxide solution is boiled for 2½ hours. The solution is mixed towards the end with animal carbon, then filtered and the pH value of the filtrate is adjusted with hydrochloric acid to 5. The precipitate is suctioned off and recrystallized from methanol. The resulting 2-methoxymethyl-4 - chloro - 5 - (3',4',5' - trimethoxybenzyl) - 6 - hydroxypyrimidine of the formula

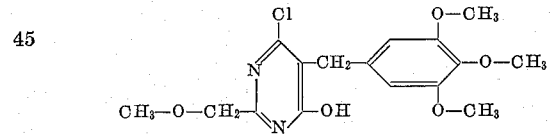

melts at 157 to 159° C.

*Example 13*

50 g. of triethylamine are stirred dropwise into a suspension of 93.5 g. of 2-methoxymethyl-4,6-dihydroxy-5-ortho-chlorobenzylpyrimidine in 300 ml. of phosphorus oxychloride at a rate such that the temperature does not rise above 50° C. The batch is heated for 2½ hours at 120° C., then the phosphorus oxychloride distilled off under vacuum, the residue stirred into ice water, the crystalline residue once more suspended in ammoniacal ice water, suctioned off, taken up in methylenechloride and this solution is dried over Siccon, filtered, the solvent is distilled off, and the residue recrystallized from methanol, to yield 2 - methoxymethyl - 4,6 - dichloro-5-ortho-chlorobenzylpyrimidine of the formula

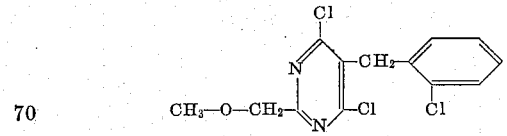

melting at 95 to 97° C.

The starting product is obtained by mixing a methylate solution from 42 g. of sodium and 600 ml. of methanol with 75 g. of methoxyacetamidine hydrochloride and 171.6 g. of ortho-chlorobenzylmalonic acid diethyl ester, refluxing the mixture for 12 hours, distilling off the methanol, adding water to the residue and adjusting the solution to pH 5 with glacial acetic acid. The precipitated 2 - methoxymethyl - 4,6-dihydroxy-5-ortho-chlorobenzyl-pyrimidine is suctioned off, dried and recrystallized from glacial acetic acid. It melts at 288 to 290° C.

Example 14

38 g. of triethylamine are dropped into a mixture of 78.8 g. of 2-methoxymethyl-4,6-dihydroxy-5-(3',4'-dichlorobenzyl)-pyrimidine and 300 ml. of phosphorus oxychloride, whereupon an exothermic reaction sets in and all passes into solution. The solution is heated for 3½ hours in an oil bath at 120° C. The phosphorus oxychloride is then distilled off under vacuum, the residue poured into ice water and the mixture is neutralized with ammonia and thoroughly agitated with ether. The ethereal solution is dried and evaporated, and the remaining 2-methoxymethyl - 4,6 - dichloro-5-(3',4'-dichlorobenzyl)-pyrimidine of the formula

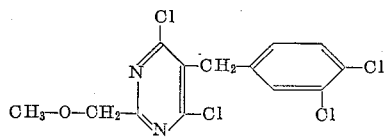

recrystallized from methanol; it melts at 93 to 95° C.

The starting material is obtained by mixing a solution of 39.6 g. of methoxyacetamidine hydrochloride and 102 g. of 3,4-dichlorobenzylmalonic acid diethyl ester in 100 ml. of methanol with a methylate solution from 22 g. of sodium in 400 ml. of methanol and refluxing the batch for 24 hours. The methanol is then distilled off and the residue dissolved in water. On acidification with acetic acid, 2-methoxymethyl - 4,6 - dihydroxy-5-(3',4'-dichlorobenzyl)-pyrimidine settles out and is recrystallized from acetic acid. It melts at 312 to 314° C.

Example 15

58 g., of 2 - methoxymethyl - 4,6-dihydroxy-5-(para-dimethyl-aminobenzyl)-pyrimidine are stirred into 200 ml. of phosphorus oxychloride. 30.3 g. of triethylamine are added dropwise and the mixture heated at 120° C. for 2½ hours. The phosphorus oxychloride is distilled off in vacuum and the residue added to a mixture of ice water and ether, and the whole washed neutral with ammonia. The ethereal phase is separated and the aqueous solution extracted twice with ether. The extracts are combined and dried, filtered and evaporated to obtain 2-methoxy-methyl - 4,6 - dichloro - 5 - (para-dimethylaminobenzyl)-pyrimidine. Melting point, 67–68° C. (from methanol).

The starting material is obtained as follows:

42.2 g. of para-dimethylamino-benzaldehyde, 160 g. of malonic acid diethyl ester, 116 g. of caproic acid, and 42.5 g. of piperidine are refluxed in 1 liter of benzene with the use of a water separator. When 1 mol of water has separated, the benzene is evaporated off, a yellow product precipitating. The product is washed with ether and recrystallized from ethanol. Melting point, 105 to 106° C. 202 g. of it are hydrogenated in 1700 ml. of ethanol at 50° C. with 2 g. of PtO₂ in the course of 50 minutes. The batch is filtered and evaporated and the residue subjected to fractional distillation. The para-dimethyl-aminobenzylmalonic acid diethyl ester passes over at 169–170° C. under a pressure of 0.2 mm. of Hg.

146 g. of para-dimethyl-aminobenzylmalonic acid diethyl ester and 62 g. of methoxyacetamidine hydrochloride are condensed with a methylate solution from 34.5 g. of sodium and 600 ml. of methanol by refluxing for 12 hours. The methanol is then distilled off and the residue dissolved in water. On acidification with acetic acid, 2-methoxymethyl - 4,6 - dihydroxy-5-(para-dimethylamino-benzyl)-pyrimidine settles out; it melts at 249 to 251° C. with decomposition.

Example 16

26.9 g. of the 2-methoxymethyl-4,6-dichloro-5-phenyl-pyrimidine described in Example 5 and 800 ml. of aqueous 2 N-sodium hydroxide solution are heated and stirred in an oil bath at 120° C. The hot solution is treated with animal carbon and filtered while still hot. After cooling, the pH value of the filtrate is adjusted to 5 with glacial acetic acid. The 2-methoxymethyl-4-chloro-5-phenyl-6-hydroxypyrimidine of the formula

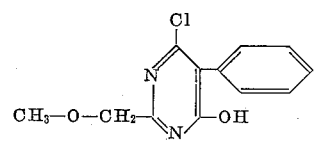

is suctioned off and recrystallized from methanol; it melts at 185 to 186° C.

Example 17

57 g. of the 2-methoxymethyl-4,6-dichloro-5-benzyl-pyrimidine described in Example 1 and 200 ml. of liquid ammonia are reacted in an autoclave for 10 hours at 70° C. The ammonia is then blown off and the residue recrystallized from ethyl acetate, to yield 2-methoxy-methyl-4-chloro-5-benzyl-6-aminopyrimidine of the formula

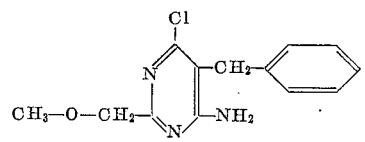

melting at 171° C.

Example 18

14.8 g. of 2-methoxymethyl-4,6-dichloro-5-(β-phenethyl)-pyrimidine and 400 ml. of aqueous 2 N-sodium hydroxide solution are heated in an oil bath for 15 hours at 120° C. while being vigorously stirred. While still hot, the batch is filtered and the cooled filtrate acidified with glacial acetic acid. The precipitated 2-methoxy-methyl-4-chloro-5-(β-phenethyl)-6-hydroxypyrimidine is suctioned off, thoroughly washed with water suctioned off and recrystallized from methanol; it melts at 178 to 179° C.

Example 19

28.3 g. of the 2-methoxy-methyl-4,6-dichloro-5-benzyl-pyrimidine described in Example 1 are dissolved in 150 ml. of methanol. To the resulting solution is added dropwise in the course of 30 minutes at 30° C. a methylate solution of 2.3 g. of sodium in 150 ml. of methanol. The batch is stirred on for 4 hours at room temperature, the precipitated sodium chloride filtered off, and the methanol distilled off. The residue is fractionated in a high vacuum to obtain 2-methoxymethyl-4-chloro-5-benzyl-6-methoxy-pyrimidine of the formula

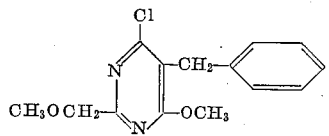

which boils at 133° C. under a pressure of 0.18 mm. of Hg.

Example 20

At 0–5° C., 14 g. of the 2-methoxymethyl-4,6-dichloro-5-benzyl-pyrimidine described in Example 1 are added in portions to 30 ml. of piperidine and the batch stirred on for 2 hours at this temperature. On addition of 100 ml. of water an oil separates which is taken up in methylene chloride. The methylene chloride phase is washed several times with water, then dried over Siccon, filtered, and freed from methylene chloride by distillation. By fractionating the residue there is obtained the 2-methoxymethyl-4-chloro-5-benzyl-6-piperidino-pyrimidine of the formula

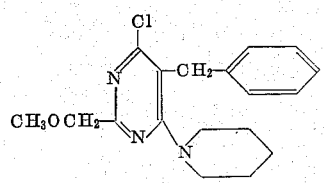

which boils at 174 to 176° C. under a pressure of 0.25 mm. of Hg.

*Example 21*

14 g. of the 2-methoxymethyl-4,6-dichloro-5-benzyl-pyrimidine described in Example 1 are added to 60 ml. of pyrrolidine in such manner that the temperature does not exceed 5° C. The batch is then stirred on for half an hour at room temperature, water is added with cooling to precipitate the 2-methoxy-methyl-4-chloro-5-benzyl-6-pyrrolidino-pyrimidine of the formula

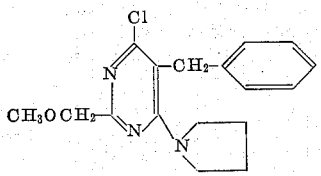

which is filtered off with suction. After recrystallization from methanol, the product melts at 127 to 128° C.

*Example 22*

At 0–5° C., 14 g. of the 2-methoxymethyl-4,6-dichloro-5-benzyl-pyrimidine described in Example 1 are added to 30 ml. of morpholine, and the batch stirred on for 2 hours at the same temperature. On addition of 100 ml. of water an oil precipitates which is taken up in methylene chloride. The methylene chloride phase is washed several times with water, dried over Siccon, filtered, the methylene chloride distilled off, and the residue distilled in a high vacuum. There is obtained the 2-methoxymethyl-4-chloro-5-benzyl-6-morpholino-pyrimidine of the formula

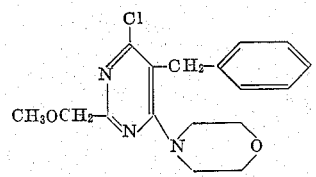

which boils at 183 to 185° C. under a pressure of 0.1 mm. of Hg.

*Example 23*

42 ml. of triethylamine are added dropwise to a mixture of 66 g. of 2-methoxymethyl-4,6-dihydroxy-5-(4'-tertiary butyl-2',6'-dimethyl-benzyl)-pyrimidine and 300 ml. of phosphorus oxychloride, and the mixture heated at 60° C. for 12 hours. The phosphorus oxychloride is distilled off, the residue diluted with 300 ml. of methylene chloride, and the solution run into ice water in such manner that the temperature does not exceed 10° C. and the pH value does not drop below 7. The methylene chloride phase is separated, washed with water, dried over sodium sulfate, and the methylene chloride filtered off. By distillation under a high vacuum there is obtained the 2 - methoxy-methyl-4,6-dichloro-5-(4'-tertiary butyl-2',6'-dimethyl-benzyl)-pyrimidine of the formula

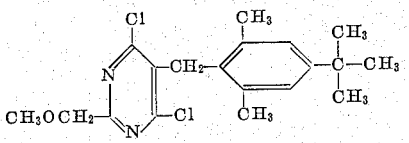

which boils at 170 to 171° C. under a pressure of 0.15 mm. of Hg.

The starting material can be obtained as follows:

160 g. of malonic acid diethyl ester are added to a solution of 23 g. of sodium in 1 liter of ethanol. While cooling with ice, 210 g. of 4-tertiary butyl-2',6'-dimethyl benzyl chloride are then added. The batch is heated at 70° C. for 1 hour, the ethanol then evaporated, water added, and the 4-tertiary butyl-2',6'-dimethyl-benzyl-malonic acid diethyl ester extracted with ether. After drying and expelling the ether, the product is distilled; it boils at 143 to 145° C. under a pressure of 0.08 mm. of Hg.

31 g. of methoxyacetamidine hydrochloride and 95.5 g. of 4-tertiary butyl-2',6'-dimethyl-benzylmalonic acid diethyl ester are added to a methylate solution obtained from 17.2 g. of sodium and 300 ml. of methanol, and the batch heated at 60° C. for 18 hours. The methanol is distilled off and the residue dissolved in water. On acidification with glacial acetic acid the 2-methoxy-methyl - 4,6-dihydroxy-5-(4'-tertiary butyl-2',6'-dimethyl-benzyl)-pyrimidine precipitates and is recrystallized from glacial acetic acid. It melts at 314 to 318° C.

What is claimed is:

1. A compound of the formula

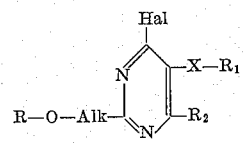

in which Hal presents halogen, Alk represents lower alkylene, R represents a member selected from the group consisting of lower alkyl, lower alkenyl, cyclo-lower alkyl, cyclo-lower alkenyl, cyclo-lower alkyl-lower alkyl and cyclo-lower alkenyl-lower alkyl, X represents a member selected from the group consisting of a direct bond and lower alkylene, $R_1$ represents a member selected from the group consisting of phenyl and phenyl substituted by at least one member selected from the group consisting of halogen, lower alkyl, lower alkoxy, lower alkenyloxy, methylenedioxy, amino and trifluoromethyl and $R_2$ represents a member selected from the group consisting of hydrogen, lower alkyl, hydroxy, lower alkoxy, halogen, amino, amino substituted by 1 to 2 members selected from the group consisting of lower alkyl, cyclo-lower alkyl, cyclo-lower alkyl-lower alkyl, oxa-lower alkyl, oxacyclo-lower akyl and oxacyclo-lower alkyl-lower alkyl, lower alkyleneamino and oxa-lower alkyleneamino.

2. A salt of a compound of claim 1, said salt being a member selected from the group consisting of an alkali group, alkaline earth group and an organic amine salt when said compound of claim 1 is acidic and said salt being an acid addition salt when said compound of claim 1 is basic.

3. A compound of the formula

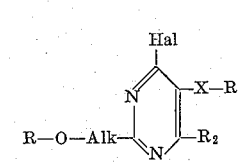

in which Hal represents halogen, Alk represents lower alkylene, R represents a member selected from the group consisting of lower alkyl, lower alkenyl, cyclo-lower alkyl, cyclo-lower alkenyl, cyclo-lower alkyl-lower alkyl and cyclo-lower alkenyl-lower alkyl, X represents a member selected from the group consisting of a direct bond and lower alkylene, $R_1$ represents a member selected from the group consisting of phenyl and phenyl substituted by at least one member selected from the group consisting of halogen, lower alkyl, lower alkoxy, lower alkenyloxy, methylenedioxy, amino and trifluoromethyl and $R_2$ represents a member selected from the group consisting of hydrogen and lower alkyl.

4. A compound of the formula

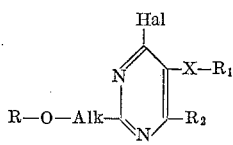

in which Hal represents halogen, Alk represents lower alkylene, R represents a member selected from the group consisting a lower alkyl, lower alkenyl, cyclo-lower alkyl, cyclo-lower alkenyl, cyclo-lower alkyl-lower alkyl and cyclo-lower alkenyl-lower alkyl, X represents a member selected from the group consisting of a direct bond and lower alkylene, $R_1$ represents a member selected from the group consisting of phenyl and phenyl substituted by at least one member selected from the group consisting of halogen, lower alkyl, lower alkoxy, lower alkenyloxy, methylenedioxy, amino and trifluoromethyl and $R_2$ represents a member selected from the group consisting of hydroxy, amino, amino substituted by 1 to 2 members selected from the group consisting of lower alkyl, cyclo-lower alkyl, cyclo-lower alkyl-lower alkyl, oxa-lower alkyl, oxacyclo-lower alkyl and oxacyclo-lower alkyl-lower alkyl, lower alkyleneamino and oxa-lower alkyleneamino.

5. A salt of a compound of claim 4, said salt being a member selected from the group consisting of an alkali group, alkaline earth group and an organic amine salt when said compound of claim 4 is acidic and said salt being an acid addition salt when said compound of claim 4 is basic.

6. A compound of the formula

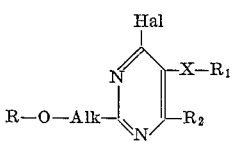

in which Hal represents halogen, Alk represents lower alkylene, R represents a member selected from the group consisting of lower alkyl, lower alkenyl, cyclo-lower alkyl, cyclo-lower alkenyl, cyclo-lower alkyl-lower alkyl and cyclo-lower alkenyl-lower alkyl, X represents a member selected from the group consisting of a direct bond and lower alkylene, $R_1$ represents a member selected from the group consisting of phenyl and phenyl substituted by at least one member selected from the group consisting of halogen, lower alkyl, lower alkoxy, lower alkenyloxy, methylenedioxy, amino and trifluoromethyl and $R_2$ represents lower alkoxy.

7. A compound of the formula

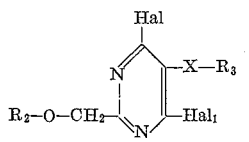

in which Hal and $Hal_1$ each represents a halogen atom, $R_2$ represents lower alkyl, X stands for a member selected from the group consisting of a direct bond and lower alkylene, and $R_3$ for a member selected from the group consisting of phenyl and phenyl substituted by at least one member selected from the group consisting of halogen, lower alkyl, lower alkoxy, lower alkenyloxy, methylenedioxy, amino and trifluoromethyl.

8. A compound of the formula

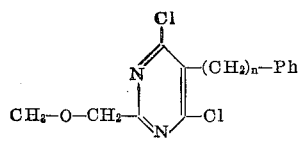

in which Ph represents a member selected from the group consisting of phenyl and phenyl substituted by at least one member selected from the group consisting of lower alkyl and alkoxy groups, halogen atoms and trifluoromethyl groups, and $n$ is an integer from 0 to 1.

9. The 2-methoxymethyl-4,6-dichloro-5-benzyl-pyrimidine.

10. The 2-methoxymethyl-4,6-dichloro-5-phenyl-pyrimidine.

11. A compound of the formula

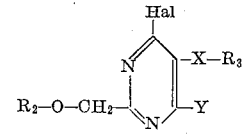

in which Hal represents a halogen atom, and Y a member selected from the group consisting of hydroxyl, amino, amino substituted by 1 to 2 members selected from the group consisting of lower alkyl, cyclo-lower alkyl, cyclo-lower alkyl-lower alkyl, oxa-lower alkyl, oxacyclo-lower alkyl and oxacyclo-lower alkyl-lower alkyl, lower alkyleneamino and oxa-lower alkyleneamino, $R_2$ stands for lower alkyl, X for a member selected from the group consisting of lower alkylene, and a direct bond, and $R_3$ for a member selected from the group consisting of phenyl and phenyl substituted by at least one member selected from the group consisting of halogen, lower alkyl, lower alkoxy, lower alkenyloxy, methylenedioxy, amino and trifluoromethyl.

12. A salt of a compound of claim 11, said salt being a member selected from the group consisting of an alkali group, alkaline earth group and an organic amine salt when said compound is a 6-hydroxy-pyrimidine and said salt being an acid addition salt when said compound is a 6-amino-pyrimidine.

13. A compound of the formula

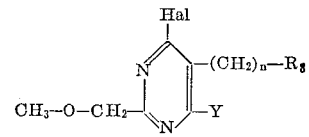

in which Hal represents a halogen atom, and Y a member selected from the group consistnig of hydroxyl, amino, amino substituted by 1 to 2 members selected from the group consisting of lower alkyl, cyclo-lower alkyl, cyclo-lower alkyl-lower alkyl, oxa-lower alkyl, oxacyclo-lower alkyl and oxacyclo-lower alkyl-lower alkyl, lower alkyleneamino and oxa-lower alkyleneamino, $R_3$ stands for a member selected from the group consisting of phenyl and phenyl substituted by at least one member selected from the group consisting of halogen, lower alkyl, lower alkoxy, lower alkenyloxy, methylenedioxy, amino and trifluoromethyl, and $n$ is an interger from 0 to 1.

14. A compound of one of the formulae

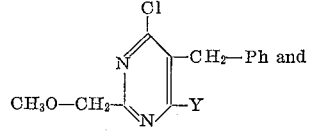 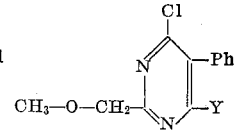

in which Y stands for a member selected from the group consisting of hydroxy, amino, amino substituted by 1 to 2 members selected from the group consisting of lower alkyl, cyclo-lower alkyl, cyclo-lower alkyl-lower alkyl, oxa-lower alkyl, oxacyclo-lower alkyl and oxacyclo-lower alkyl-lower alkyl, lower alkyleneamino and oxa-lower alkyleneamino, and Ph stands for a member selected from the group consisting of phenyl and phenyl substituted by at least one member selected from the group consisting of lower alkyl and alkoxy groups, halogen atoms and trifluoromethyl groups.

15. A compound of claim 11 in which Y represents a member selected from the group consisting of hydroxy, amino, di-lower alkylamino, pyrrolidino, piperidino and morpholino.

16. A compound of claim 13 in which Y represents a member selected from the group consisting of hydroxy, amino, di-lower alkylamino, pyrrolidino, piperidino and morpholino.

17. A compound of claim 14 in which Y represents a member selected from the group consisting of hydroxy, amino, di-lower alkylamino, pyrrolidino, piperidino and morpholino.

18. A compound of the formula

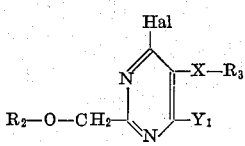

in which Hal represents a halogen atom, $R_2$ lower alkyl, X stands for a member selected from the group consisting of a direct bond and lower alkylene and $R_3$ for a member selected from the group consisting of phenyl and phenyl substituted by at least one member selected from the group consisting of halogen, lower alkyl, lower alkoxy, lower alkenyloxy, methylenedioxy, amino and trifluoromethyl, and $Y_1$ for a member selected from the group consisting of hydrogen and lower alkyl.

19. A compound of the formula

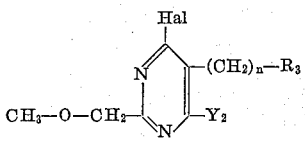

in which $n$ is an integer from 0 to 1, Hal represents a halogen atom, $R_3$ stands for a member selected from the group consisting of phenyl and phenyl substituted by at least one member selected from the group consisting of halogen, lower alkyl, lower alkoxy, lower alkenyloxy, methylenedioxy, amino and trifluoromethyl, and $Y_2$ represents a member selected from the group consisting of hydrogen and methyl.

20. A compound of the formula

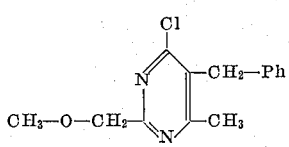

in which Ph represents a member selected from the group consisting of phenyl and phenyl substituted by at least one member selected from the group consisting of alkyl and alkoxy groups, halogen atoms and trifluoromethyl groups.

21. The 2-methoxymethyl-4-chloro-5-benzyl-6-methyl-pyrimidine.

22. The 2-methoxymethyl-4-chloro-5-benzyl-6-hydroxy-pyromidine.

23. The 2-methoxymethyl-4-chloro-5-benzyl-6-methyl-amino-pyrimidine.

24. The 2-methoxymethyl-4,6 - dichloro-5-para-chloro-phenyl-pyrimidine.

25. The 2-ethoxymethyl-4,6 - dichloro-5-benzyl-pyrimidine.

26. The 2-methoxymethyl-4,6 - dichloro-5-(para-methoxy-benzyl)-pyrimidine.

27. The 2-methoxymethyl-4 - chloro-5-(para-methoxy-benzyl)-6-hydroxy-pyrimidine.

28. The 2-methoxymethyl - 4,6-dichloro-5-(3',4',5'-trimethoxybenzyl)-pyrimidine.

29. The 2-methoxymethyl-4 - chloro - 5-(3',4',5'-trimethoxybenzyl)-6-hydroxy-pyrimidine.

30. The 2-methoxymethyl-4,6-dichloro-5-ortho-chloro-benzylpyrimidine.

31. The 2-methoxymethyl-4,6-dichloro-5-(3',4'-dichlorobenzyl)-pyrimidine.

32. The 2-methoxymethyl-4,6-dichloro-5-(para-dimethylaminobenzyl)-pyrimidine.

33. The 2-methoxymethyl-4-chloro-5-phenyl-6-hydroxy-pyrimidine.

34. The 2-methoxymethyl-4-chloro-5-benzyl-6-amino-pyrimidine.

35. The 2-methoxymethyl-4-chloro-5-benzyl-6-methoxy-pyrimidine.

36. The 2-methoxymethyl-4 - chloro-5-benzyl-6-piperidino-pyrimidine.

37. The 2-methoxymethyl-4-chloro-5-benzyl-6-pyrrolidino-pyrimidine.

38. The 2-methoxymethyl-4-chloro-5-benzyl-6-morpholino-pyrimidine.

39. The 2-methoxymethyl-4,6 - dichloro-5-(4'-tertiary-butyl-2',6'-dimethyl-benzyl)-pyrimidine.

40. A compound of the formula

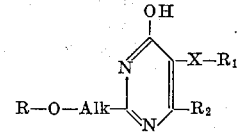

in which Alk represents lower alkylene, R represents a member selected from the group consisting of lower alkyl, lower alkenyl, cyclo-lower alkyl, cyclo-lower alkenyl, cyclo-lower alkyl-lower alkyl and cyclo-lower alkenyl-lower alkyl, X represents a member selected from the group consisting of a direct bond and lower alkylene, $R_1$ represents a member selected from the group consisting of phenyl and phenyl substituted by at least one member selected from the group consisting of halogen, lower alkyl, lower alkoxy, lower alkenyloxy, methylenedioxy, amino and trifluoromethyl and $R_2$ represents a member selected from the group consisting of hydrogen, lower alkyl, hydroxy, lower alkoxy, halogen, amino, amino substituted by 1 to 2 members selected from the group consisting of lower alkyl, cyclo-lower alkyl, cyclo-lower alkyl-lower alkyl, oxa-lower alkyl, oxacyclo-lower alkyl and oxacyclo-lower alkyl-lower alkyl, lower alkyleneamino and oxa-lower alkyleneamino.

41. A compound of the formula

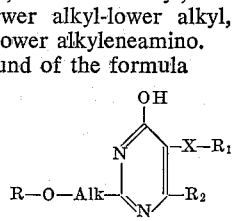

in which Alk represents lower alkylene, R represents a member selected from the group consisting of lower alkyl, lower alkenyl, cyclo-lower alkyl, cyclo-lower alkenyl, cyclo-lower alkyl-lower alkyl and cyclo-lower alkenyl-lower alkyl, X represents a member selected from the group consisting of a direct bond and lower alkylene, $R_1$ represents a member selected from the group consisting of phenyl and phenyl substituted by at least one member selected from the group consisting of halogen, lower alkyl, lower alkoxy, lower alkenyloxy, methylenedioxy, amino and trifluoromethyl and $R_2$ represents hydroxy.

42. A compound of the formula

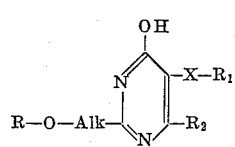

in which Alk represents lower alkylene, R represents a member selected from the group consisting of lower alkyl, lower alkenyl, cyclo-lower alkyl, cyclo-lower alkenyl, cyclo-lower alkyl-lower alkyl and cyclo-lower alkenyl-lower alkyl, X represents a member selected from the group consisting of a direct bond and lower alkylene, $R_1$ represents a member selected from the group consisting of phenyl and phenyl substituted by at least one member selected from the group consisting of halogen, lower alkyl, lower alkoxy, lower alkenyloxy, methylenedioxy, amino and trifluoromethyl and $R_2$ represents a member selected from the group consisting of hydrogen and lower alkyl.

43. 2-methoxymethyl-4,6-dihydroxy - 5-phenyl-pyrimidine.

44. 2-methoxymethyl-4,6-dihydroxy - 5-benzyl-pyrimidine.

45. 2-methoxymethyl-4-hydroxy-5 - benzyl - methyl-pyrimidine.

No references cited.

ALEX MAZEL, *Primary Examiner.*

HENRY R. JILES, *Examiner.*

R. J. GALLAGHER, *Assistant Examiner.*

UNITED STATES PATENT OFFICE
CERTIFICATE OF CORRECTION

Patent No. 3,290,306                                   December 6, 1966

Paul Schmidt et al.

It is hereby certified that error appears in the above numbered patent requiring correction and that the said Letters Patent should read as corrected below.

Column 2, line 2, for "penytlene" read -- pentylene --; same line 2, for "(1,6))" read -- (1,6) --; line 22, for "lakyl" read -- alkyl --; column 6, line 53, for "reaction" read -- residue --; column 10, lines 13 to 18, the right-hand portion of the formula should appear as shown below instead of as in the patent:

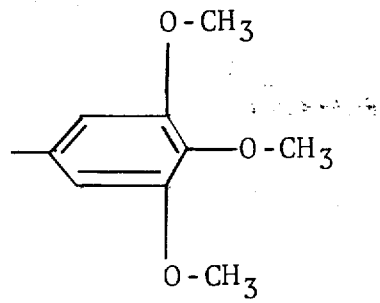

column 16, line 44, for "consistnig" read -- consisting --.

Signed and sealed this 28th day of November 1967.

(SEAL)
Attest:

EDWARD M. FLETCHER, JR.                          EDWARD J. BRENNER
Attesting Officer                                       Commissioner of Pate